United States Patent
Lhost et al.

(10) Patent No.: US 12,234,328 B1
(45) Date of Patent: Feb. 25, 2025

(54) POLYETHYLENE COMPOSITION FOR INJECTION MOLDING

(71) Applicants: TOTALENERGIES ONETECH, Courbevoie (FR); CENTRE NATIONAL DE LA RECHERCHE SCIENTIFIQUE (CNRS), Paris (FR); UNIVERSITÉ CLAUDE BERNARD LYON 1 (UCBL), Villeurbanne (FR); UNIVERSITÉ JEAN MONNET SAINT-ETIENNE, Saint-Etienne (FR); INSTITUT NATIONAL DES SCIENCES APPLIQUÉES DE LYON (INSA LYON), Villeurbanne (FR)

(72) Inventors: Olivier Lhost, Seneffe (BE); Yves Trolez, Seneffe (BE); Pascal Navez, Seneffe (BE); Philippe Cassagnau, Villeurbanne (FR); Karim Delage, Villeurbanne (FR); Mohammad Abou-Taha, Villeurbanne (FR)

(73) Assignees: TOTALENERGIES ONETECH, Courbevoie (FR); CENTRE NATIONAL DE LARECHERCHE SCIENTIFIQUE(CNRS), Paris (FR); UNIVERSITÉ CLAUDE BERNARDLYON 1 (UCBL), Villeurbanne (FR); UNIVERSITÉ JEAN MONNETSAINT-ETIENNE, Saint-Etienne (FR); INSTITUT NATIONAL DESSCIENCES APPLIQUÉES DE LYON(INSA LYON), Villeurbanne (FR)

( * ) Notice: Subject to any disclaimer, the term of this patent is extended or adjusted under 35 U.S.C. 154(b) by 0 days.

(21) Appl. No.: 18/837,103

(22) PCT Filed: Feb. 1, 2023

(86) PCT No.: PCT/EP2023/052401
§ 371 (c)(1),
(2) Date: Aug. 8, 2024

(87) PCT Pub. No.: WO2023/151996
PCT Pub. Date: Aug. 17, 2023

(30) Foreign Application Priority Data

Feb. 10, 2022 (EP) ..................... 22315030

(51) Int. Cl.
*C08J 11/06* (2006.01)
*B29B 7/48* (2006.01)
*B29B 7/82* (2006.01)
*B29K 23/00* (2006.01)
*B29K 105/00* (2006.01)
*B29K 105/26* (2006.01)
*B29L 31/00* (2006.01)

(52) U.S. Cl.
CPC ............... *C08J 11/06* (2013.01); *B29B 7/48* (2013.01); *B29B 7/823* (2013.01); *B29K 2023/065* (2013.01); *B29K 2105/0094* (2013.01); *B29K 2105/26* (2013.01); *B29K 2995/0012* (2013.01); *B29K 2995/0063* (2013.01); *B29L 2031/7158* (2013.01); *C08J 2323/06* (2013.01)

(58) Field of Classification Search
USPC .......................................................... 521/47
See application file for complete search history.

(56) References Cited

U.S. PATENT DOCUMENTS

2012/0070615 A1  3/2012  Shi et al.

FOREIGN PATENT DOCUMENTS

| EP | 1237947 A1 | 9/2002 |
|---|---|---|
| JP | H10180842 A | 7/1998 |
| JP | 2904830 B2 | 6/1999 |
| JP | 2009197138 A | 9/2009 |
| JP | 2019104107 A | 6/2019 |
| WO | 2021064113 A1 | 4/2021 |

OTHER PUBLICATIONS

International Preliminary Report on Patentability issued in Application No. PCT/EP2023/052401, dated Aug. 6, 2024, 7 pages.
G.J. Ray et al.; "Carbon-13 Nuclear Magnetic Resonance Determination of Monomer Composition and Sequence Distribution in Ethylene-Propylene Copolymers Prepared with a Stereoregular Catalyst System", Macromolecules, 1977, vol. 10, No. 4, pp. 773-778.
International Search Report and Written Opinion issued in Application No. PCT/EP2023/052401, dated May 24, 2023, 10 pages.

*Primary Examiner* — Terressa Boykin
(74) *Attorney, Agent, or Firm* — Ewing & Jones, PLLC (57) ABSTRACT

Polyethylene composition comprising at least 50 wt. % of polyethylene based on the total weight of the polyethylene composition, and having a density of at least 0.910 g/cm$^3$; a melt index MI$_2$ ranging from 3.0 to 60.0 g/10 min; an unsaturation index higher than 2,000 wherein the unsaturation index is the product of the Mn in Dalton and the vinyl unsaturation units per 1,000 carbon atoms as determined by ASTM D6248-98:2004; a complex viscosity at 0.1 rad/sec at 190° C. ranging from 200 to 20,000 Pa·s; and a ratio of complex viscosity at a frequency of 0.01 rad/sec to the complex viscosity at a frequency of 100 rad/sec of at most 8.0, said ratio being measured at 190° C.

20 Claims, 3 Drawing Sheets

POLYETHYLENE COMPOSITION FOR INJECTION MOLDING

CROSS-REFERENCE TO RELATED APPLICATIONS

This application claims the benefit of PCT/EP2023/052401 filed Feb. 1, 2023, which claims priority from EP 22315030.1 filed Feb. 10, 2022, which are incorporated herein by reference in their entireties for all purposes.

TECHNICAL FIELD

The present disclosure relates to polyethylene compositions, with preference comprising recycled polyethylene, that are suitable for injection molding as well as processes to produce such polyethylene compositions.

TECHNICAL BACKGROUND

Upon the needs, it is sometimes useful to have the possibility to treat an existing polyolefin or an existing polyolefin composition to modify some properties. Nowadays, to facilitate subsequent recycling of the polyolefins or polyolefin compositions, there is a need for treatments and processes that allow achieving such modifications without having to blend in other polyolefins and/or additives. Properties that might need to be modified are, for example, the melt flow index, the viscosity, the odours, the level of impurities etc.

PCR (post-consumer recycled) that contains polyethylene may have low melt index values, typically close to $MI_2$ of 0.2 g/10 min for PCR polyethylene originating from small containers (shampoo bottles, . . . ) and close to $MI_2$ of 1.0 g/10 min for PCR polyethylene originated from films, which makes them rather unsuitable for injection moulding and hence, limits the applications of recycled polyethylene-containing materials. There is, therefore, a demand for methods to treat these recycled polyethylene-containing materials to transform them into polyethylene compositions that are suitable for injection molding applications.

A method that could increase and control the melt flow index and/or the viscosity of polyethylene or polyethylene-containing material, such as recycled polyethylene-containing material, would create a significant added value to the recycled polyethylene compositions as it expands their application field. Such a method may also contribute to the plastic waste problem, as more plastics can be turned into a useful polyethylene composition after recycling.

An increase in the melt index of PCR polyethylene is not at all obvious as, during a standard extrusion process, the melt index generally decreases. The situation is slightly different in polypropylene as methods for increasing the melt flow index of polypropylene exist. However, these methods involve reactive extrusion with the addition of peroxide. However, such methods result in polypropylene with peroxide decomposition products whereas there is a rising demand for "clean" polyolefins. If high peroxide content must be avoided, e.g., to avoid too many peroxide residuals, the melt index increase in polypropylene in a standard extrusion process is limited. In addition, the use of organic peroxide leads to polyethylene branching and cross-linking.

Even when polypropylene is present in a polyethylene composition, which may be very frequent in PCR polyethylene, the high content of polyethylene of at least 50 wt. % will contribute to a melt index decrease during a standard pelletization. Hence, there is a demand for-clean-methods of treatment of initial polyethylene-containing material and/or methods of treatment of an initial polyethylene-containing material providing an increase in melt flow index and improved properties for injection molding applications. Preferably, the method of treatment of a polyethylene-containing initial material should have a low safety risk, especially in terms of fire risk.

There is also a need for polyethylene compositions, suitable for injection molding applications, that are preferably originated from recycled polyolefins.

There is a need to produce polyethylene compositions suitable for injection molding applications with reduced viscosity.

WO2021/064113 discloses a method wherein a polyolefin composition is produced with a method wherein ultrasounds are applied to a material that can be recycled polyolefin. While the disclosed method is providing very good results there is still room for further improvements in such a field in particular for the implementation of methods or processes at an industrial level. There is also a need for simple and cost-effective processes.

There is a need to provide polyethylene compositions for injection molding that show improved processability as well as an improved balance of properties including cleaningness (such as VOC content).

SUMMARY

It has now been found that one or more of the above-mentioned needs can be fulfilled by performing a single extrusion of existing polyethylene-containing material, such as recycled polyethylene-containing material resulting in a new polyethylene composition suitable for injection molding.

According to a first aspect, the present disclosure relates to a polyethylene composition comprising at least 50 wt. % of polyethylene based on the total weight of the polyethylene composition, remarkable in that the polyethylene composition has:
  a density of at least 0.910 g/cm³ as determined according to ISO 1183-1:2012 at 23° C.;
  a melt index $MI_2$ ranging from 3.0 to 60.0 g/10 min as determined according to ISO 1133-2011 at 190° C. under a load of 2.16 kg;
  an unsaturation index higher than 2,000 wherein the unsaturation index is the product of the Mn in Dalton and the vinyl unsaturation units per 1,000 carbon atoms as determined by ASTM D6248-98:2004;
  a complex viscosity at 0.1 rad/sec at 190° C. ranging from 200 to 20,000 Pas s determined according to the method defined in the description; and
  a ratio of complex viscosity at a frequency of 0.01 rad/sec to the complex viscosity at a frequency of 100 rad/sec of at most 8.0, said ratio being measured at 190° C.

Surprisingly it has been found that the polyethylene compositions according to the above definition shows an improved processability for injection molding application and at the same time an improved balance of properties including cleaningness (such as VOC content). In a preferred embodiment, the polyethylene composition is produced by a process of treatment of an initial polyethylene material and the For example, the polyethylene composition has a ratio of complex viscosity at a frequency of 0.01 rad/sec to the complex viscosity at a frequency of 100 rad/sec of at most 7.0, said ratio being measured at 190° C.

For example, the polyethylene composition further has a tan delta (G"/G') at 0.1 rad at 190° C. above 2.5; preferably of at least 3.0; more preferably of at least 5.0 and even more preferably of at least 10.0.

With preference, the polyethylene composition further has an Mz/Mw of at most 7.0 as determined by size exclusion chromatography; preferably at most 6.0; preferably at most 5.0.

For example, the polyethylene composition has an Mw/Mn ranging from 2.5 to 10.0 as determined by size exclusion chromatography; preferably from 2.8 to 5.0.

For example, the polyethylene composition has a density of at least 0.912 g/cm$^3$ as determined according to ISO 1183-1:2012 at 23° C.; preferably at least 0.915 g/cm$^3$; more preferably at least 0.920 g/cm$^3$; even more preferably at least 0.930 g/cm$^3$.

For example, the polyethylene composition has a density ranging from 0.920 g/cm$^3$ to 0.965 g/cm$^3$ as determined according to ISO 1183-1:2012 at 23° C.; preferably, ranging from 0.930 g/cm$^3$ to 0.960 g/cm$^3$.

In an embodiment, the polyethylene composition has a density of at least 0.932 g/cm$^3$ as determined according to ISO 1183-1:2012 at 23° C.; preferably at least 0.940 g/cm$^3$; more preferably at least 0.945 g/cm$^3$; even more preferably at least 0.950 g/cm$^3$. For example, the polyethylene composition has a density ranging from 0.932 g/cm$^3$ to 0.965 g/cm$^3$ as determined according to ISO 1183-1:2012 at 23° C.; preferably, ranging from 0.945 g/cm$^3$ to 0.960 g/cm$^3$.

For example, the polyethylene composition has a melt index MI$_2$ ranging from 3.5 to 40.0 g/10 min as determined according to ISO 1133-2011 at 190° C. under a load of 2.16 kg; preferably ranging from 4.0 to 20.0 g/10 min.

For example, the polyethylene composition has an unsaturation index higher than 3,500 wherein the unsaturation index is the product of the Mn in Dalton and the vinyl unsaturation units per 1,000 carbon atoms as determined by ASTM D6248-98:2004; preferably higher than 5000, even preferably higher than 7000; wherein the unsaturation index is product of the Mn, in Dalton, and the vinyl unsaturation units per 1,000 carbon atoms.

In an embodiment, the polyethylene composition has a complex viscosity at 0.1 rad/sec at 190° C. ranging from 250 to 18,000 Pa·s; preferably from 300 to 15,000 Pa·s; more preferably from 400 to 12,000 Pa·s; even more preferably from 410 to 10,000 Pa·s; most preferably from 410 to 9,000 Pa·s; and even most preferably from 400 to 8,000 Pa·s, or from 400 to 5,000 Pa·s.

For example, the polyethylene composition has a complex viscosity at 0.1 rad/sec at 190° C. of at most 18,000 Pas; preferably of at most 15,000 Pa·s; more preferably of at most 12,000 Pa·s, even more preferably of at most 10,000 Pa·s; most preferably of at most 9,000 Pa·s; and even most at most 8,000 Pa·s, or at most 5,000 Pa·s.

According to a second aspect, the disclosure provides for the polyethylene composition according to the first aspect remarkable in that it is produced by a process comprising the following steps:
 a) providing a twin-screw extruder with thermal regulation devices;
 b) providing an initial polyethylene-containing material comprising at least 50 wt. % of polyethylene based on the total weight of the initial polyethylene-containing material;
 c) extruding the initial polyethylene-containing material to obtain a polyethylene composition; wherein extrusion is performed with a residence time of less than 20 min; and
 d) recovering a polyethylene composition;
wherein step (c) of extruding comprises a thermal treatment of the initial polyethylene-containing material at a temperature of at least 340° C. in one or more hot zones of the extruder
 by self-heating of the material wherein the one or more hot zones have a total length equal to or greater than 6 D with D being the screw diameter, wherein the extrusion is performed with mechanical specific energy greater than or equal to 0.4 kWh/kg, wherein the screw profile comprises at least one hot zone with successive kneading blocks elements over a length of at least 4 D followed by a left-handed element with D being the screw diameter, wherein the thermal regulation devices are set to initial imposed barrel temperatures ranging between 24° and 320° C. and are switched off when the barrel temperature in the zone spontaneously exceeds the imposed barrel temperature by at least 1° C. without the need of external heat application; preferably, by at least 3° C.; or
 by heating the material using the thermal regulation devices of the extruder to have a maximum barrel temperature ranging from 340 to 460° C. in at least one hot zone of the extruder.

Surprisingly it has been found that it was possible to upgrade an initial polyethylene-containing material to a higher melt index and lower viscosity, thereby reaching values suitable for injection molding applications by thermal treatment; without the need for additives or other specific treatments such as ultrasounds. In particular, the increase in the melt index is obtained without the use of flow modifiers. The process is remarkable by its simplicity since it can be performed in a twin-screw extruder. As demonstrated by the examples, the increase in melt index can be of a factor up to 80.

The process is also remarkable because there is no chemical way to perform the scission of the polyethylene chain. At the usual temperature of processing and with standard extrusion conditions, there is a branching of the polyethylene chain (decrease of MI$_2$). The use of organic peroxide leads to polyethylene branching and crosslinking. The huge increase in the melt index by a factor of at least 10 (such as at least 20 or at least 40) together with the general lowering of the complex viscosity (such as the flattening of the complex viscosity curves at low frequency) obtained by the specific extrusion conditions allows replying to long-felt need in the recycling field by enlarging the possible applications for the recycled feedstock.

Indeed, as shown by the examples, the process is remarkable in that the viscosity of the polyethylene composition of lowered by comparison to the viscosity of the initial polyethylene-containing material at both 0.1 rad/sec and 100 rad/sec which renders the treated polyethylene suitable for injection molding applications.

In an embodiment, the thermal treatment is performed by self-heating of the material, and the screw profile comprises two or more hot zones wherein a first hot zone comprises successive kneading blocks elements over a length of at least 4 D followed by a left-handed element with D being the screw diameter, and one or more additional hot zones placed downstream the first hot zone are filled mixing zones, each comprising kneading blocks elements over a length of at least 4 D followed by a kneading left-handed element or by a left-handed element with D being the screw diameter.

In an embodiment, the thermal treatment is performed by self-heating of the material and the successive kneading blocks elements of at least one hot zone of the extruder comprise disks with disks offset by 90 degrees and a disk width of at least 0.3 D wherein D is the screw diameter.

In an embodiment, one hot zone of the extruder is or comprises the melting zone of the extruder.

In a preferred embodiment, the ratio of the melt index of the polyethylene composition ($MI_2$ T) to the melt index of the initial polyethylene-containing material ($MI_2$ R) is at least 10. This can be obtained by proper selection of the temperature of the thermal treatment and of the residence time.

In a preferred embodiment, the mechanical specific energy used during extrusion is selected to have the ratio of the melt index of the polyethylene composition ($MI_2$ T) to the melt index of the initial polyethylene-containing material ($MI_2$ R) to be at least 10.

For example, the ratio of the melt index of the polyethylene composition ($MI_2$ T) to the melt index of the initial polyethylene-containing material ($MI_2$ R) is at least 10; preferably, at least 15; preferably, at least 20; preferably, at least 30; preferably, at least 40.

In an embodiment, the initial polyethylene-containing material is selected to have:
- a high load melt index (HLMI R) of at least 1.0 g/10 min as determined according to ISO 1133-2011 at 190° C. under a load of 21.6 kg; and/or
- a melt index ($MI_2$ R) of at most 3.0 g/10 min as determined according to ISO 1133-2011 at 190° C. under a load of 2.16 kg; and/or
- a density of at least 0.910 g/cm³ as determined according to ISO 1183-1:2012 at 23° C.

For example, the initial polyethylene-containing material is selected to have a melt index ranging from a high load melt index (HLMI R) as determined according to ISO 1133-2011 at 190° C. under a load of 21.6 kg of at least 1.0 g/10 min to a melt index ($MI_2$ R) of at most 3.0 g/10 min as determined according to ISO 1133-2011 at 190° C. under a load of 2.16 kg.

For example, the initial polyethylene-containing material is selected to have:
- a high load melt index (HLMI R) of at least 1.0 g/10 min as determined according to ISO 1133-2011 at 190° C. under a load of 21.6 kg, a melt index ($MI_2$ R) of at most 0.45 g/10 min as determined according to ISO 1133-2011 at 190° C. under a load of 2.16 kg and a density of at least 0.940 g/cm³ as determined according to ISO 1183-1:2012 at 23° C.; or
- a melt index ($MI_2$ R) ranging from 0.8 to 1.5 g/10 min as determined according to ISO 1133-2011 at 190° C. under a load of 2.16 kg and a density ranging from 0.910 g/cm³ to less than 0.940 g/cm³ as determined according to ISO 1183-1:2012 at 23° C.; preferably from 0.910 g/cm³ to 0.935 g/cm³ and more preferably from 0.910 g/cm³ to 0.930 g/cm³.

In an embodiment, the initial polyethylene-containing material further has:
- an Mz/Mw of at least 4.0 as determined by size exclusion chromatography (SEC); and/or
- a complex viscosity at 0.1 rad/sec at 190° C. ranging from 20,000 to 80,000 Pas; and/or
- an Mw/Mn ranging from 5.0 to 30.0 as determined by size exclusion chromatography; and/or
- a complex viscosity ratio above 10 wherein the complex viscosity ratio is the ratio of the complex viscosity at a frequency of 0.1 rad/sec to the complex viscosity at a frequency of 100 rad/sec when measured at 190° C.

In one embodiment, the initial polyethylene-containing material further has a tan delta (G"/G' measured at 0.1 rad/s at 190° C.) of at most 3.0, preferably, of at most 2.6.

In one embodiment, the initial polyethylene-containing material further has a tan delta (G"/G' measured at 0.1 rad/s at 190° C.) of at least 0.5, preferably, of at least 0.8.

In one embodiment, the initial polyethylene-containing material further has a tan delta (G"/G' measured at 0.1 rad/s at 190° C.) ranging from 0.5 to 3.0; preferably, from 0.8 to 2.6.

For example, the initial polyethylene-containing material comprises at least 80 wt. % of polyethylene based on the total weight of the initial polyethylene-containing material; and/or is a recycled polyethylene-containing material.

For example, the initial polyethylene-containing material comprises at least one polymer different from polyethylene in a content ranging from 0 to 50 wt. % based on the total weight of the initial polyethylene-containing material wherein at least one polymer different from polyethylene is selected from polypropylene (PP), polyacrylate (PA), polyethylene terephthalate (PET), polystyrene (PS), polylactic acid (PLA), and any mixture thereof.

For example, the process is performed without peroxides and/or without ultrasounds.

In a preferred embodiment, step (c) of extruding the initial polyethylene-containing material comprises a thermal treatment by self-heating of the material wherein the extrusion is performed with mechanical specific energy greater than or equal to 0.45 kWh/kg, preferably greater than or equal to 0.5 kWh/kg; more preferably greater than or equal to 0.6 kWh/kg.

For example, step (c) of extruding the initial polyethylene-containing material comprises a thermal treatment by self-heating of the material or by heating of the material wherein the extrusion is performed at a maximum barrel temperature ranging from 340 to 460° C. in at least one hot zone; preferably at a maximum barrel temperature ranging from 340 to 450° C.; more preferably at a maximum barrel temperature ranging from 340 to 430° C.; even more preferably at a maximum barrel temperature ranging from 340 to 410° C. and most preferably at a maximum barrel temperature ranging from 340 to 390° C.

For example, step (c) of extruding the initial polyethylene-containing material comprises a thermal treatment at a temperature ranging from 340 to 460° C. in at least one hot zone; preferably at a temperature ranging from 340 to 450° C.; more preferably at a temperature ranging from 340 to 430° C.; even more preferably at a temperature ranging from 340 to 410° C. and most preferably at a temperature ranging from 340 to 390° C.

For example, step (c) of extruding the initial polyethylene-containing material comprises performing the extrusion at a screw speed ranging from 100 to 1200 rpm.

For example, step (c) of extruding the initial polyethylene-containing material comprises performing the extrusion with a residence time ranging from 10 seconds to 10 minutes; preferably with a residence time ranging from 20 seconds to 5 minutes; more preferably with a residence time ranging from 10 to 180 seconds; even more preferably, from 10 to 120 seconds; most preferably, from 20 to 100 seconds; and even most preferably, from 30 to 80 seconds.

For example, the polyethylene composition further has a VOC content lower than the VOC content of the initial polyethylene-containing material.

According to a third aspect, the disclosure relates to an article produced from the polyethylene composition according to the first or the second aspect, remarkable in that the article is an injection molded article; preferably, the article is selected from a bottle or a container.

According to a fourth aspect, the disclosure relates to a method to produce an injection molded article remarkable in that it comprises producing a polyethylene composition from an initial polyethylene-containing material according to second aspect and producing an injection molded article using the polyethylene composition obtained by said process; with preference, the initial polyethylene-containing material is a recycled polyethylene-containing material.

According to a fifth aspect, the disclosure relates to a method to produce an injection molded article remarkable in that it comprises a step of providing a polyethylene composition according to the first or the second aspect and producing an injection molded article using said polyethylene composition, with preference, the initial polyethylene-containing material is a recycled polyethylene-containing material.

According to a sixth aspect, the disclosure relates to a method to produce an injection molded article remarkable in that it comprises in a first step producing a polyethylene composition as defined in the first aspect or the second aspect, and in a second step using the polyethylene composition produced in the first step to produce an injection molded article; with preference, the initial polyethylene-containing material is a recycled polyethylene-containing material.

DETAILED DESCRIPTION

It is to be understood that this disclosure is not limited to particular processes or compositions described, as such processes or compositions may, of course, vary. It is also to be understood that the terminology used herein is not intended to be limiting since the scope of the present disclosure will be limited only by the appended claims.

When describing the polymers, uses and processes of the disclosure, the terms employed are to be construed by the following definitions, unless a context dictates otherwise. For the disclosure, the following definitions are given:

As used herein, the singular forms "a", "an", and "the" include both singular and plural referents unless the context dictates otherwise. By way of example, "a composition" means one composition or more than one composition.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g., 1 to 5 can include 1, 2, 3, 4, 5 when referring to, for example, a number of elements, and can also include 1.5, 2, 2.75 and 3.80, when referring to, for example, measurements). The recitation of endpoints also includes the endpoint values themselves (e.g., from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference. Indication of a standard method to determine a parameter implies referring to the standard in force at the priority date of the application, in case the year of the standard is not indicated.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art. For example, in the following claims and statements, any of the embodiments can be used in any combination.

Unless otherwise defined, all terms used in disclosing the disclosure, including technical and scientific terms, have the meaning as commonly understood by one of ordinary skill in the art to which this disclosure belongs. By means of further guidance, definitions for the terms used in the description are included to better appreciate the teaching of the present disclosure.

The terms "polyethylene" (PE) and "ethylene polymer" may be used synonymously. The term "polyethylene" encompasses ethylene homopolymer as well as ethylene copolymer resin which can be derived from ethylene and one or more comonomers selected from the group consisting of $C_3$-$C_{20}$ alpha-olefins, such as propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene.

The terms "polyethylene resin" or "ethylene homopolymer resin" or "ethylene copolymer resin" refer to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a shorthand for "polyethylene resin". The terms "fluff" or "powder" refer to polyethylene material with the hard catalyst particle at the core of each grain and is defined as the polymer material after it exits the polymerization reactor (or the final polymerization reactor in the case of multiple reactors connected in series).

The terms "Post-Consumer Resin", which may be abbreviated as "PCR", is used to denote the components of domestic waste, household waste or end-of-life vehicle waste. In other words, the PCRs are made of recycled products from waste created by consumers. The terms "Post-Industrial Resin", which may be abbreviated as "PIR", is used to denote the waste components from pre-consumer resins during packaging processes. In other words, the PIRs are made of recycled products created from scrap by manufacturers.

The term "recycled polyethylene composition" or "recycled polyethylene-containing material" contrasts with the term "virgin polyethylene composition" "virgin polyethylene-containing material", the term "virgin" is used to denote a polyethylene composition or material directly obtained from a polyethylene-containing polymerization plant. The terms "directly obtained" is meant to include that the polyethylene composition may optionally be passed through a pelletization step or an additivation step or both.

Under normal production conditions in a production plant, it is expected that the melt index (MI2, HLMI, MI5) will be different for the fluff than for the polyethylene-containing resin. Under normal production conditions in a production plant, it is expected that the density will be slightly different for the fluff than for the polyethylene-containing resin (if PCR resins are considered, it is not a question of fluff (powder) or pellets but it is a question of flakes or pellets). Unless otherwise indicated, density and melt index for the polyethylene-containing resin refer to the density and melt index as measured on the polyethylene-containing resin as defined above.

The present disclosure provides a polyethylene composition suitable for injection molding and a process to produce said composition in a process for the treatment of a initial polyethylene-containing material. The process, the initial polyethylene-containing material and the polyethylene composition produced by such a process (i.e., the treated polyethylene composition) will be described jointly.

According to the disclosure, the polyethylene composition comprising at least 50 wt. % of polyethylene based on the total weight of the polyethylene composition, wherein the polyethylene composition has:
a density of at least 0.910 g/cm³ as determined according to ISO 1183-1:2012 at 23° C.;
a melt index $MI_2$ ranging from 3.0 to 60.0 g/10 min as determined according to ISO 1133-2011 at 190° C. under a load of 2.16 kg;
an unsaturation index higher than 2,000 wherein the unsaturation index is the product of the Mn in Dalton and the vinyl unsaturation units per 1,000 carbon atoms as determined by ASTM D6248-98:2004;
a complex viscosity at 0.1 rad/sec at 190° C. ranging from 200 to 20,000 Pas; and
a ratio of complex viscosity at a frequency of 0.01 rad/sec to the complex viscosity at a frequency of 100 rad/sec of at most 8.0, said ratio being measured at 190° C.

For example, the polyethylene composition has a melt index ($MI_2$ T) ranging from 3.0 to 60.0 g/10 min as determined according to ISO 1133-2011 at 190° C. under a load of 2.16 kg. For example, the polyethylene composition has a melt index ($MI_2$ T) ranging from 3.5 to 40.0 g/10 min as determined according to ISO 1133-2011 at 190° C. under a load of 2.16 kg; preferably, ranging from 4.0 to 20.0 g/10 min; more preferably ranging from 4.5 to 15.0 g/10 min; even more preferably ranging from 5.0 to 10.0 g/10 min.

In particular, the polyethylene composition has a ratio of complex viscosity at a frequency of 0.01 rad/sec to the complex viscosity at a frequency of 100 rad/sec of at most 10, said ratio being measured at 190° C.; preferably, of at most 9.0; more preferably, of at most 8.5; even more preferably, of at most 8.0; and most preferably, of at most 7.0.

In an embodiment, the polyethylene composition has a complex viscosity at 0.1 rad/sec at 190° C. of at most 20,000 Pa·s; preferably at most 18,000 Pa·s; more preferably at most 15,000 Pa·s; even more preferably of at most 12,000 Pa·s most preferably of at most 10,000 Pa·s; and even most preferably of at most 9,000 Pa·s; or at most 8,000 Pa·s, or at most 5,000 Pa·s.

In an embodiment, the polyethylene composition has a complex viscosity at 0.1 rad/sec at 190° C. ranging from 200 to 20,000 Pa·s; preferably from 250 to 18,000 Pa·s; more preferably from 300 to 15,000 Pa·s; even more preferably from 400 to 12,000 Pa·s; most preferably from 410 to 10,000 Pa·s; and even most preferably from 410 to 9,000 Pa·s; or from 400 to 8,000 Pa·s, or from 400 to 5,000 Pa·s.

With preference, the polyethylene composition has an Mz/Mw of at most 7.0 as determined by size exclusion chromatography; preferably at most 6.0; preferably at most 5.0.

For example, the polyethylene composition further has an Mw/Mn ranging from 2.5 to 10.0 as determined by size exclusion chromatography; preferably from 2.6 to 8.0; more preferably from 2.7 to 6.0; even more preferably from 2.8 to 5.0 or from 2.9 to 4.5.

For example, the polyethylene composition further has a tan delta (G"/G') at 0.1 rad at 190° C. above 2.5; preferably of at least 3.0; more preferably of at least 5.0 and even more preferably of at least 10.0.

The polyethylene composition has a density higher than the density of the initial polyethylene-containing material.

For example, the polyethylene composition has a density of at least 0.910 g/cm³ as determined according to ISO 1183-1:2012 at 23° C. For example, the polyethylene composition has a density of at least 0.912 g/cm³ as determined according to ISO 1183-1:2012 at 23° C.; preferably, at least preferably, at least 0.915 g/cm³; more preferably, at least 0.918 g/cm³; even more preferably of at least 0.920 g/cm³; and most preferably, of at least 0.930 g/cm³.

In an embodiment, the polyethylene composition has a density of at most 0.965 g/cm³ as determined according to ISO 1183-1:2012 at 23° C.; preferably, of at most 0.962 g/cm³; and more preferably, of at most 0.960 g/cm³; and even more preferably, of at most 0.958 g/cm³.

For example, the polyethylene composition has a density ranging from 0.920 g/cm³ to 0.965 g/cm³ as determined according to ISO 1183-1:2012 at 23° C.; preferably, ranging from 0.930 g/cm³ to 0.960 g/cm³.

In an embodiment, the polyethylene composition has a density of at least 0.910 g/cm³ as determined according to ISO 1183-1:2012 at 23° C.; preferably, at least preferably, at least 0.912 g/cm³; more preferably, at least 0.915 g/cm³; and even more preferably of at least 0.916 g/cm³. For example, the polyethylene composition has a density of at most 0.930 g/cm³ as determined according to ISO 1183-1:2012 at 23° C.; preferably, of at most 0.928 g/cm³; and more preferably, of at most 0.925 g/cm³. For example, the polyethylene composition has a density ranging from 0.910 g/cm³ to less than 0.940 g/cm³ as determined according to ISO 1183-1:2012 at 23° C.; preferably, ranging from 0.910 g/cm³ to 0.935 g/cm³; more preferably, ranging from 0.910 g/cm³ to 0.930 g/cm³; even more preferably, ranging from 0.912 g/cm³ to 0.928 g/cm³; most preferably, ranging from 0.915 g/cm³ to 0.925 g/cm³; and even most preferably, ranging from 0.916 g/cm³ to 0.925 g/cm³.

In an embodiment, the polyethylene composition has a density of at least 0.940 g/cm³ as determined according to ISO 1183-1:2012 at 23° C.; preferably, at least preferably, at least 0.945 g/cm³; more preferably, at least 0.948 g/cm³; even more preferably of at least 0.950 g/cm³; and most preferably, of at least 0.951 g/cm³. For example, the polyethylene composition has a density of at most 0.965 g/cm³ as determined according to ISO 1183-1:2012 at 23° C.; preferably, of at most 0.962 g/cm³; and more preferably, of at most 0.960 g/cm³. For example, the polyethylene composition has a density ranging from 0.940 g/cm³ to 0.965 g/cm³ as determined according to ISO 1183-1:2012 at 23° C.; preferably, ranging from 0.942 g/cm³ to 0.964 g/cm³; more preferably, ranging from 0.945 g/cm³ to 0.962 g/cm³; and even more preferably, ranging from 0.948 g/cm³ to 0.960 g/cm³.

For example, the polyethylene composition has an unsaturation index higher than 3,500 wherein the unsaturation index is the product of the Mn in Dalton and the vinyl unsaturation units per 1,000 carbon atoms as determined by ASTM D6248-98:2004; preferably higher than 5000, even preferably higher than 7000; wherein the unsaturation index is the product of the Mn, in Dalton, and the vinyl unsaturation units per 1,000 carbon atoms.

The polyethylene composition comprises at least 50 wt. % of polyethylene based on the total weight of the polyethylene composition. With preference, the polyethylene composition comprises at least 55 wt. % of polyethylene based on the total weight of the polyethylene composition; preferably, at least 60 wt. %; preferably, at least 70 wt. %; preferably, at least 80 wt. %; preferably, at least 90 wt. %; preferably, at least 95 wt. %.

In an embodiment, the polyethylene composition is a virgin material and consists of polyethylene (i.e. comprises 100 wt. % of polyethylene).

In an embodiment, the polyethylene composition is made of a recycled polyethylene-containing material. Recycled polyethylene-containing material may contain one or more polymers different from polyethylene.

In an embodiment, and in particular wherein the polyethylene composition is made of a recycled polyethylene-containing material; the polyethylene composition comprises at least one polymer different from polyethylene in a content ranging from 0 to 50 wt. % based on the total weight of the polyethylene composition wherein at least one polymer different from polyethylene is selected from polypropylene (PP), polyacrylate (PA), polyethylene terephthalate (PET), polystyrene (PS), polylactic acid (PLA), and any mixture thereof.

With preference, the polyethylene composition comprises at least one polymer different from polyethylene in a content ranging from 0 to 40 wt. % based on the total weight of the polyethylene composition; preferably from 0.1 to 20 wt. %; more preferably from 0.2 to 10 wt. %; and even more preferably from 0.5 to 5 wt. %.

For example, PCR polyethylene classically contains a small part of polypropylene (such as less than 5 wt. %).

Producing the Polyethylene Composition

In a preferred embodiment, the polyethylene composition corresponds to a treated initial material; wherein the melt index has been increased. However, surprisingly, the treatment performed also provides other features to the polyethylene composition that makes it particularly suitable for injection molding.

Thus, the disclosure also provides the above-defined polyethylene composition being produced by a process comprising the following steps:
a) providing a twin-screw extruder with thermal regulation devices;
b) providing an initial polyethylene-containing material comprising at least 50 wt. % of polyethylene based on the total weight of the initial polyethylene-containing material;
c) extruding the initial polyethylene-containing material to obtain a polyethylene composition; wherein extrusion is performed with a residence time of less than 20 min; and
d) recovering a polyethylene composition;
wherein step (c) of extruding comprises a thermal treatment of the initial polyethylene-containing material at a temperature of at least 340° C. in one or more hot zones of the extruder
by self-heating of the material wherein the one or more hot zones have a total length equal to or greater than 6 D with D being the screw diameter, wherein the extrusion is performed with mechanical specific energy greater than or equal to 0.4 kWh/kg, wherein the screw profile comprises at least one hot zone with successive kneading blocks elements over a length of at least 4 D followed by a left-handed element with D being the screw diameter, wherein the thermal regulation devices are set to initial imposed barrel temperatures ranging between 24° and 320° C. and are switched off when the barrel temperature in the zone spontaneously exceeds the imposed barrel temperature by at least 1° C. without the need of external heat application; or
by heating the material using the thermal regulation devices of the extruder to have a maximum barrel temperature ranging from 340 to 460° C. in at least one hot zone of the extruder.

The process of treating initial polyethylene-containing material involves increasing the melt index of the said initial polyethylene-containing material to produce a polyethylene composition with a melt index that is increased by a factor k of more than 6.0; preferably by a factor k of at least 7.0; preferably by a factor k of at least 8.0; preferably by a factor k of at least 10.0; preferably by a factor k of at least 15.0; preferably by a factor k of at least 20.0; preferably by a factor k of at least 30.0; preferably by a factor k of at least 35.0; preferably by a factor k of at least 40.0.

So that the ratio of the melt index of the polyethylene composition ($MI_2$ T) to the melt index of the initial polyethylene-containing material ($MI_2$ R) is more than 6.0; preferably of at least 7.0, preferably by at least 8.0; preferably at least 10.0; preferably at least 15.0; preferably at least 20.0; preferably at least 30.0; preferably at least 35.0; preferably at least 40.0.

The Twin-Screw Extruder with Thermal Regulation Devices and the Step c) of Extruding the Initial Polyethylene-Containing Material to Obtain a Polyethylene Composition The treatment of the initial polyethylene-containing material to obtain a polyethylene composition is performed by extrusion wherein extrusion is performed with a residence time of less than 20 min and wherein step (c) of extruding comprises a thermal treatment of the initial polyethylene-containing material at a temperature of at least 300° C. in one or more hot zones of the extruder.

Figure 1:
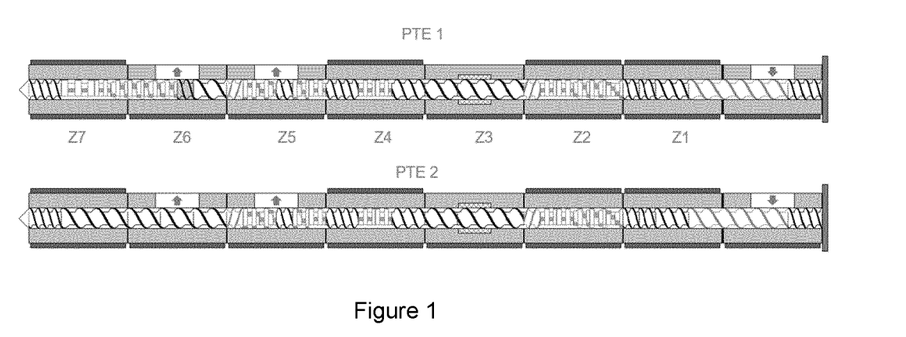
FIG. 1 illustrates possible screw profiles to be used in the context of the disclosure.

The extruder is a twin-screw extruder. The extruder can be provided with a standard configuration for the screw profile (for example when the process comprises a thermal treatment by heating the material using the thermal regulation devices) or is provided with a screw profile that shows an aggressive design, as shown in FIG. 1, to impart high mechanical energy to the initial polyethylene-containing material (for example when the process comprises a thermal treatment by self-heating or by heating the material using the thermal regulation devices)

As known to the person skilled in the art, thermal regulation devices can be used as heating means to impart thermal energy to the initial polyethylene-containing material in the extruder, in addition to the thermal energy already generated by the mixing.

Extrusion mixing varies with the type of screw and screw profile and is capable of significant generation of mechanical energy, such as shear energy and/or elongation energy. Therefore, energy is introduced into the extrusion process in terms of mechanical energy and thermal energy. Heating and/or cooling of the barrels can be achieved, for example, electrically, by steam, or by the circulation of thermally controlled liquids such as oil or water.

The extruder screw comprises a screw main body, that is composed of cylindrical elements and an axis of rotation supporting the elements. The axis of rotation extends straight from its basal end to its tip. In a state in which the extruder screw is rotatably inserted in the cylinder of the barrel, the basal end of the extruder screw is positioned on one end side of the barrel, on which the supply port is provided, and the tip of the extruder screw is positioned on the other end side of the barrel, on which the discharge port is provided.

Screw extruders have a modular system that allows different screw elements to be drawn into the central shaft to build a defined screw profile. The extruder screw may comprise one or more elements selected from conveying elements, kneading elements, right-handed (normal) screw elements, left-handed (inverse) screw elements and any combination thereof. The elements are arranged in a defined order from the basal end to the tips of the extruder screw and this order, as well as the type and number of elements involved, define the screw profile. Extruders and screw elements are commercially available for example at Leistritz.

In an embodiment of the disclosure, the treatment of the initial polyethylene-containing material is handled by mechanical energy.

When high mechanical energy is requested, the extruder provided has a specific screw profile that is built to be "aggressive", meaning that high mechanical energy will be imparted to the initial polyethylene-containing material. High mechanical energy will result in an increase in the temperature in the extruder as known to the person skilled in the art so that the thermal treatment is performed by self-heating of the material.

In such an embodiment, the twin-screw extruder is selected to comprise one or more hot zones, preferably being filled mixing zones, wherein the total length of the one or more hot zones is equal to or greater than 6 D with D being the screw diameter.

It is understood that in case the screw profile is selected to comprise a single hot zone, then the total length of the said hot zone is equal to or greater than 6 D with D being the screw diameter. In such a case, the hot zone is also the melting zone of the twin-screw extruder.

In case, the screw profile comprises two or more hot zones, then a first hot zone comprises successive kneading blocks elements over a length of at least 4 D followed by a left-handed element with D being the screw diameter, and one or more additional hot zones placed downstream the first hot zone are filled mixing zones, each comprising kneading blocks elements over a length of at least 4 D followed by a kneading left-handed element or by a left-handed element with D being the screw diameter. For example, the twin-screw extruder comprises two filled mixing zones wherein each of the filled mixing zones has a length equal to or greater than 4 D with D being the screw diameter. Preferably the first hot zone is or comprises the melting zone of the extruder.

Various mixing elements could be considered in the one or more hot zones but the most preferred ones do not drive any forward conveying (dispersive kneading blocks elements with disks offset by 90 degrees). Other disk offset angles could be considered (for example, 30 degrees, 45 degrees, and/or 60 degrees) but 90 degrees is preferred. The preferred minimum width of the disk is 0.3 D.

Thus, preferably, the successive kneading blocks elements of at least one hot zone comprise disks with disks offset by 90 degrees and a disk width of at least 0.3 D wherein D is the screw diameter.

For example, the twin-screw extruder comprises more than two filled mixing zones wherein the total length of filled mixing zones is equal to or greater than 8 D with D being the screw diameter.

For example, the strong melting zone of the twin-screw extruder is made of successive mixing elements over a length of 4 D, with D being the screw diameter, followed by a left-handed element; preferably a full-flight left-handed element.

In a preferred embodiment, the thermal regulation devices of the twin-screw extruder allow cooling the barrels and the process comprises switching off the thermal regulation devices when the barrel temperature in the zone spontaneously exceeds the imposed barrel temperature by at least 1° C. without the need of external heat application; preferably, by at least 2° C., preferably, by at least 3° C.; more preferably by at least 5° C.; even more preferably, by at least 8° C.; and most preferably, by at least 10° C.

Indeed, when starting extrusion, thermal regulation devices will be switched on, in particular in the melting zone to allow the material to melt. Then, when the polymer is self-heating the thermal regulation devices are switched off to allow the increase in the temperature inside the extruder.

In a preferred embodiment, step (c) of extruding the initial polyethylene-containing material comprises performing the extrusion with mechanical specific energy greater than or equal to 0.45 kWh/kg, preferably greater than or equal to 0.5 kWh/kg; more preferably greater than or equal to 0.6 kWh/kg.

High rotation screw speeds are preferred, but the precise value of a high rotation screw speed is "extruder diameter" dependent. For example, when considering a diameter D of 18 mm twin-screw extruder, high rotational screw speed is considered to be higher than 500 rpm, preferably higher than 800 rpm. For example, when considering a diameter D=58 mm twin-screw extruder, high rotational screw speed is considered to be higher than 250 rpm, preferably higher than 350 rpm.

Non-limiting examples of suitable extruder screws with specific screw profiles are illustrated in FIG. 1 as PTE1 and PTE2.

When the thermal treatment is performed by heating the material, the extruder provided can show either an extruder screw with a standard screw profile or with a specific screw profile (i.e., aggressive configuration).

In such an embodiment, step c) is performed at a maximum barrel temperature of at least 340° C.; preferably at least 350° C.; more preferably at least 360° C.

Whatever the thermal treatment is performed by heating or self-heating of the material, the thermal treatment of material in step c) is preferably performed at a maximum barrel temperature ranging from 340 to 460° C.; preferably, ranging from 340° C. to 450° C.; more preferably ranging from 340° C. to 430° C.; even more preferably, ranging from 340° C. to 410° C. and most preferably, ranging from 340° C. to 390° C. The maximum barrel temperature is the highest temperature amongst the imposed or measured temperatures along the extruder.

For example, step (c) of extruding the initial polyethylene-containing material comprises a thermal treatment at a temperature of at least 340° C. in one or more hot zones of the extruder; preferably at a temperature of at least 350° C.; more preferably at a temperature of at least 360° C.; even more preferably at a temperature ranging from 340 to 410° C. and most preferably at a temperature ranging from 350 to 390° C., or at a temperature ranging from 360 to 460° C.

For example, step (c) of extruding the initial polyethylene-containing material comprises a thermal treatment at a temperature ranging from 340 to 460° C. in one or more hot zones of the extruder; preferably at a temperature ranging from 340 to 450° C.; more preferably at a temperature ranging from 340 to 430° C.; even more preferably at a temperature ranging from 340 to 410° C. and most preferably at a temperature ranging from 340 to 390° C.

For example, step (c) of extruding the initial polyethylene-containing material comprises a thermal treatment at a temperature of at least 340° C.; preferably, at least 345° C.; more preferably, at least 350° C.; even more preferably, at least 355° C.; and most preferably, at least 360° C.

For example, step (c) of extruding the initial polyethylene-containing material comprises a thermal treatment at a temperature of at most 460° C.; preferably, at most 450° C.; more preferably, at most 440° C.; even more preferably, at most 440° C.; most preferably, at most 430° C.; even most preferably, at most 420° C. or at most 410° C. or at most 405° C. or at most 400° C. or at most 395° C. or at most 390° C.

The temperature of the thermal treatment is the maximum barrel temperature.

The extrusion conditions may be adapted by the person skilled in the art to impart sufficient energy to obtain a polyethylene composition with a melt index ($MI_2$ T) in the targeted range.

Screw speed can be adapted in function of the targeted maximum barrel temperature and of the capacity of the extruder. Higher screw speed allows a higher increase in the polymer temperature. For example, the screw speed ranging from 100 to 1200 rpm; preferably from 110 rpm to 1200 rpm; more preferably from 150 rpm to 1100 rpm; even more preferably from 200 rpm to 1000 rpm; most preferably from 300 rpm to 900 rpm; and even most preferably from 320 to 800 rpm or from 350 to 1200 rpm.

In an 18 mm screw diameter twin-screw extruder, the preferred screw speed is higher than 500 rpm; in a 58 mm screw diameter twin-screw extruder, the preferred screw speed is higher than 250 rpm.

For example, step (c) of extruding the initial polyethylene-containing material comprises performing the extrusion with a residence time ranging from 10 seconds to 10 minutes; preferably with a residence time ranging from 20 seconds to 5 minutes; more preferably with a residence time ranging from 10 to 180 seconds or from 10 to 120 seconds or from 20 to 100 seconds or from 30 to 80 seconds.

The Initial Polyethylene-Containing Material and the Step b) of Providing an Initial Polyethylene-Containing Material The process according to the disclosure comprises a step b) of providing an initial polyethylene-containing material comprising at least 50 wt. % of polyethylene based on the total weight of the initial polyethylene-containing material.

The initial polyethylene-containing material can be a virgin polyethylene-containing material, a recycled polyethylene-containing material or a mixture of virgin and recycled polyethylene-containing materials. In some embodiments, the initial polyethylene-containing material is a recycled polyethylene-containing material. As used herein, the terms "recycled polyethylene composition" encompasses both Post-Consumer Resins (PCR) and Post-Industrial Resins (PIR).

Suitable polyethylene includes but is not limited to homopolymer of ethylene, copolymer of ethylene and a higher alpha-olefin comonomer. Thus, preferably, the polyethylene in the initial polyethylene-containing material is one or more polyethylene homopolymers, one or more polyethylene copolymers, and any mixture thereof.

The term "copolymer" refers to a polymer, which is made by linking two different types of monomers in the same polymer chain. Preferred comonomers are alpha-olefins having from 3 to 20 carbon atoms or from 3 to 10 carbon atoms. More preferred comonomers are selected from the group comprising propylene, butene-1, pentene-1, hexene-1, heptene-1, octene-1, nonene-1, decene-1 and any mixture thereof. Even more preferred comonomers are selected from the group comprising butene-1, hexene-1, octene-1 and any mixture thereof. The most preferred comonomer is hexene-1.

The term "homopolymer" refers to a polymer that is made by linking only one monomer in the absence of comonomers. Ethylene homopolymers are therefore essentially without any comonomer. By "essentially without" is meant that no comonomer is intentionally added during the production of the polyethylene, but can nevertheless be present in up to 0.2 wt. %, preferably in up to 0.1 wt. % and most preferably in up to 0.05 wt. %, relative to the total weight of the polyethylene.

The initial polyethylene-containing material is selected to comprise at least 50 wt. % of polyethylene based on the total weight of the initial polyethylene-containing material. With preference, the initial polyethylene-containing material is selected to comprise at least 55 wt. % of polyethylene based on the total weight of the initial polyethylene-containing material; preferably, at least 60 wt. %; preferably, at least 70 wt. %; preferably, at least 80 wt. %; preferably, at least 90 wt. %; preferably, at least 95 wt. %.

In an embodiment, the initial polyethylene-containing material is a virgin material and consists of polyethylene (i.e. comprises 100 wt. % of polyethylene).

In an embodiment, the initial polyethylene-containing material is a recycled polyethylene-containing material. Recycled polyethylene-containing material may contain one or more polymers different from polyethylene.

In an embodiment, and in particular wherein the initial polyethylene-containing material is a recycled polyethylene-containing material; the initial polyethylene-containing material comprises at least one polymer different from polyethylene in a content ranging from 0 to 50 wt. % based on the total weight of the initial polyethylene-containing material wherein at least one polymer different from polyethylene is selected from polypropylene (PP), polyacrylate (PA), polyethylene terephthalate (PET), polystyrene (PS), polylactic acid (PLA), and any mixture thereof.

With preference, the initial polyethylene-containing material comprises at least one polymer different from polyethylene in a content ranging from 0 to 40 wt. % based on the total weight of the initial polyethylene-containing material; preferably from 0.1 to 20 wt. %; more preferably from 0.2 to 10 wt. %; and even more preferably from 0.5 to 5 wt. %.

For example, PCR polyethylene classically contains a small part of polypropylene (such as less than 5 wt. %).

In an embodiment, the initial polyethylene-containing material, or the polyethylene in the initial polyethylene-containing material, has a high load melt index (HLMI R) of at least 1.0 g/10 min as determined according to ISO 1133-2011 at 190° C. under a load of 21.6 kg; preferably at least 1.2 g/10 min; more preferably at least 1.5 g/10 min.

In an embodiment the initial polyethylene-containing material, or the polyethylene in the initial polyethylene-containing material, has a melt index (MI$_2$ R) of at least 0.10 g/10 min as determined according to ISO 1133-2011 at 190° C. under a load of 2.16 kg; preferably at least 0.15 g/10 min; more preferably at least 0.2 g/10 min; even more preferably at least 0.5 g/10 min. most preferably at least 0.8 g/10 min and even most preferably at least 0.9 g/10 min, or at least 1.0 g/10 min.

For example, the initial polyethylene-containing material is selected to have a melt index ranging from a high load melt index (HLMI R) as determined according to ISO 1133-2011 at 190° C. under a load of 21.6 kg of at least 1.0 g/10 min to a melt index (MI$_2$ R) of at most 3.0 g/10 min as determined according to ISO 1133-2011 at 190° C. under a load of 2.16 kg.

In an embodiment the initial polyethylene-containing material, or the polyethylene in the initial polyethylene-containing material, has a melt index (MI$_2$ R) of at most 3.0 g/10 min as determined according to ISO 1133-2011 at 190° C. under a load of 2.16 kg; preferably at most 2.8 g/10 min; more preferably at most 2.5 g/10 min; even more preferably at most 2.2 g/10 min. most preferably at most 2.0 g/10 min and even most preferably at most 1.8 g/10 min, or at most 1.6 g/10 min.

For example, the initial polyethylene-containing material, or the polyethylene in the initial polyethylene-containing material, has a density of at least 0.910 g/cm$^3$ as determined according to ISO 1183-1:2012 at 23° C.

In an embodiment, the initial polyethylene-containing material is selected to have a high load melt index (HLMI R) of at least 1.0 g/10 min as determined according to ISO 1133-2011 at 190° C. under a load of 21.6 kg, a melt index (MI$_2$ R) of at most 0.45 g/10 min as determined according to ISO 1133-2011 at 190° C. under a load of 2.16 kg and a density of at least 0.940 g/cm$^3$ as determined according to ISO 1183-1:2012 at 23° C.

For example, the initial polyethylene-containing material, or the polyethylene in the initial polyethylene-containing material, has a density of at least 0.940 g/cm$^3$ as determined according to ISO 1183-1:2012 at 23° C.; preferably, at least preferably, at least 0.945 g/cm$^3$; more preferably, at least 0.948 g/cm$^3$; even more preferably of at least 0.950 g/cm$^3$; and most preferably, of at least 0.951 g/cm$^3$.

For example, the initial polyethylene-containing material, or the polyethylene in the initial polyethylene-containing material, has a density of at most 0.965 g/cm$^3$ as determined according to ISO 1183-1:2012 at 23° C.; preferably, of at most 0.962 g/cm$^3$; and more preferably, of at most 0.960 g/cm$^3$.

For example, the initial polyethylene-containing material, or the polyethylene in the initial polyethylene-containing material, has a density ranging from 0.940 g/cm$^3$ to 0.965 g/cm$^3$ as determined according to ISO 1183-1:2012 at 23° C.; preferably, ranging from 0.942 g/cm$^3$ to 0.964 g/cm$^3$; more preferably, ranging from 0.945 g/cm$^3$ to 0.962 g/cm$^3$; and even more preferably, ranging from 0.948 g/cm$^3$ to 0.960 g/cm$^3$.

For example, the initial polyethylene-containing material, or the polyethylene in the initial polyethylene-containing material, has a melt index ranging from a high load melt index (HLMI R) as determined according to ISO 1133-2011 at 190° C. under a load of 21.6 kg of at least 1.0 g/10 min to a melt index (MI$_2$ R) of at most 0.45 g/10 min as determined according to ISO 1133-2011 at 190° C. under a load of 2.16 kg.

For example, the initial polyethylene-containing material, or the polyethylene in the initial polyethylene-containing material, has a high load melt index (HLMI R) of at least 1.0 g/10 min as determined according to ISO 1133-2011 at 190° C. under a load of 21.6 kg; preferably at least 1.2 g/10 min; more preferably at least 1.5 g/10 min.

For example, the initial polyethylene-containing material, or the polyethylene in the initial polyethylene-containing material, has a melt index (MI$_2$ R) of at most 0.45 g/10 min as determined according to ISO 1133-2005 at 190° C. under a load of 2.16 kg; preferably, at most 0.42 g/10 min; more preferably at most 0.40 g/10 min; even more preferably ranging at most 0.35 g/10 min.

In another embodiment, the initial polyethylene-containing material is selected to have a melt index (MI$_2$ R) ranging from 0.8 to 1.5 g/10 min as determined according to ISO 1133-2011 at 190° C. under a load of 2.16 kg and a density ranging from 0.910 g/cm$^3$ to less than 0.940 g/cm$^3$ as determined according to ISO 1183-1:2012 at 23° C.; preferably from 0.910 g/cm$^3$ to 0.935 g/cm$^3$ and more preferably from 0.910 g/cm$^3$ to 0.930 g/cm$^3$.

With preference, the initial polyethylene-containing material, or the polyethylene in the initial polyethylene-containing material, has a density of at least 0.910 g/cm$^3$ as determined according to ISO 1183-1:2012 at 23° C.; preferably, at least preferably, at least 0.912 g/cm$^3$; more preferably, at least 0.915 g/cm$^3$; and even more preferably of at least 0.916 g/cm$^3$.

For example, the initial polyethylene-containing material, or the polyethylene in the initial polyethylene-containing material, has a density of less than 0.940 g/cm$^3$ as determined according to ISO 1183-1:2012 at 23° C.; preferably, of at most 0.935 g/cm$^3$; more preferably, of at most 0.930 g/cm$^3$; even more preferably, of at most 0.928 g/cm$^3$; and most preferably, of at most 0.925 g/cm$^3$.

For example, the initial polyethylene-containing material, or the polyethylene in the initial polyethylene-containing material, has a density ranging from 0.910 g/cm$^3$ to less than 0.940 g/cm$^3$ as determined according to ISO 1183-1:2012 at 23° C.; preferably, ranging from 0.910 g/cm$^3$ to 0.935 g/cm$^3$; more preferably, ranging from 0.910 g/cm$^3$ to 0.930 g/cm$^3$; even more preferably ranging from 0.912 g/cm$^3$ to 0.928 g/cm$^3$; most preferably, ranging from 0.915 g/cm$^3$ to 0.925 g/cm$^3$; and even most preferably, ranging from 0.916 g/cm$^3$ to 0.925 g/cm$^3$.

For example, the initial polyethylene-containing material, or the polyethylene in the initial polyethylene-containing material, has a melt index (MI$_2$ R) ranging from 0.8 to 1.5 g/10 min as determined according to ISO 1133-2011 at 190° C. under a load of 2.16 kg; preferably, ranging from 0.8 to 1.4 g/10 min; more preferably ranging from 0.9 to 1.3 g/10 min; even more preferably ranging from 1.0 to 1.2 g/10 min.

In some embodiments, the initial polyethylene-containing material or the polyethylene in the initial polyethylene-containing material has an Mz/Mw of at least 4.0 as determined by gel permeation chromatography; preferably, ranging from 4.0 to 50.0; preferably, from 5.0 to 25.0; preferably, from 7.0 to 15.0.

In some embodiments, the initial polyethylene-containing material or the polyethylene in the initial polyethylene-containing material, has a complex viscosity at 0.1 rad/sec at 190° C. ranging from 20,000 to 80,000 Pa·s; preferably, ranging from 22,000 to 70,000 Pa·s; more preferably, ranging from 25,000 to 60,000 Pas; and even more preferably, ranging from 30,000 to 50,000 Pa·s.

In some embodiments, the initial polyethylene-containing material or the polyethylene in the initial polyethylene-containing material, has an Mw/Mn ranging from 5.0 to 30.0 as determined by gel permeation chromatography; preferably ranging from 6.0 to 20.0; preferably ranging from 7.0 to 15.0.

In some embodiments, the initial polyethylene-containing material or the polyethylene in the initial polyethylene-containing material, has a complex viscosity ratio above 10; preferably, a complex viscosity ratio of at least 11; more preferably, a complex viscosity ratio of at least 12.

In one embodiment, the initial polyethylene-containing material further has a tan delta (G"/G' measured at 0.1 rad/s at 190° C.) of at most 3.0; preferably of at most 2.6.

In one embodiment, the initial polyethylene-containing material further has a tan delta (G"/G' measured at 0.1 rad/s at 190° C.) ranging from 0.5 to 3.0; preferably, from 0.8 to 2.6.

Step d) Recovering a Polyethylene Composition

Step d) comprises recovering the polyethylene composition as defined above that is the treated initial polyethylene-containing material.

For example, the polyethylene composition has a VOC content lower than the VOC content of the initial polyethylene-containing material.

VOC is the amount of volatile organic compounds (VOC) in ppm wherein the volatile compounds are defined to be chains with 12 carbon atoms or a lower number. This reduction of VOC is beneficial but a very significant decrease of such content is needed to eliminate the odour.

The present disclosure encompasses articles produced from the polyethylene composition as defined above wherein the article is an injection-molded article; preferably, the article is selected from a bottle or a container.

For example, the article is produced using from 40 wt. % to 100 wt. % of initial polyethylene-containing material being a recycled polyethylene-containing and has VOC content lower than the initial polyethylene-containing material.

Test Methods

The melt flow index MI$_2$ of the polyethylene is determined according to ISO 1133-2011 at 190° C. under a load of 2.16 kg.

The HLMI of the polyethylene is determined according to ISO 1133-2011 at 190° C. under a load of 21.6 kg.

The Mn, Mw, Mz, Mw/Mn and Mz/Mw: The molecular weight (M$_n$ (number average molecular weight), M$_w$ (weight average molecular weight) and molecular weight distributions D (Mw/Mn) were determined by size exclusion chromatography (SEC. Briefly, a GPC-IR5 from Polymer Char was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806 MS (Showa Denko) and one Styragel HT6E (Waters) columns were used with a flow rate of 1 ml/min (eluent: trichlorobenzene). Detector: Infrared detector (2800-3000 cm-1). Calibration: narrow standards of polystyrene (PS) (commercially available). Calculation of molecular weight Mi of each fraction i of eluted polyethylene is based on the Mark-Houwink relation ($\log_{10}$ (M$_{PE}$)=0.965909×$\log_{10}$ (M$_{PS}$)−0.28264) (cut off on the low molecular weight end at M$_{PE}$=1000).

The molecular weight averages used in establishing molecular weight/property relationships are the number average (M$_n$), weight average (M$_w$) and z average (M$_z$) molecular weight. These averages are defined by the following expressions and are determined from the calculated M$_i$:

$$M_n = \frac{\sum_i N_i M_i}{\sum_i N_i} = \frac{\sum_i W_i}{\sum_i W_i / M_i} = \frac{\sum_i h_i}{\sum_i h_i / M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here N$_i$ and W$_i$ are the number and weight, respectively, of molecules having molecular weight Mi. The third representation in each case (farthest right) defines how one obtains these averages from SEC chromatograms. h$_i$ is the height (from baseline) of the SEC curve at the i$_{th}$ elution fraction and M$_i$ is the molecular weight of species eluting at this increment.

The molecular weight distribution (MWD) is then calculated as Mw/Mn.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well-known to the skilled person and include, for example, sufficient relaxation time etc. In practice, the intensity of a signal is obtained from its integral, i.e., the corresponding area. The data are acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenize the sample, followed by the addition of hexa-deuterobenzene ($C_6D_6$, spectroscopic grade) and a minor amount of hexamethyldisiloxane (HMDS, 99.5+%), with HMDS serving as an internal standard. To give an example, about 200 mg to 600 mg of polymer is dissolved in 2.0 mL of TCB, followed by the addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The comonomer content in polyethylene is determined by $^{13}$C-NMR analysis of pellets according to the method described by G. J. Ray et al. (*Macromolecules*, 1977, 10, (4), 773-778).

Crystallisation temperature (Tc) and Melting temperature (Tm) are determined according to ISO 11357-3:2018 on a DSC Q2000 instrument by TA Instruments. To erase the thermal history the samples are first heated to 220° C. and kept at 220° C. for 3 minutes. Then the polymer is cooled at −20° C./min. up to 20° C. and kept at 20° C. for 3 minutes. The crystallization temperature is determined during this cooling step. The crystallization temperature Tc corresponds to the temperature of the extremum of the spectrogram presenting the heat flux associated with the polymer as a function of the temperature during its cooling. The polymer is then melted up to 220° C. at 20° C./min. and the melting temperature is determined during this heating step. The melting temperature corresponds to the temperature of the extremum of the spectrogram presenting the heat flux associated with the polymer as a function of the temperature during its melting.

The density was measured according to the method of standard ISO 1183-1:2012 (immersion method) at a temperature of 23° C.

Complex shear modulus and viscosity: The complex shear modulus $G^*(w)=G'(w)+jG''(w)$ ($J^2=-1$, $G'(w)$: storage modulus and $G''(w)$: loss modulus) was determined using a DHR-2, a stress-controlled rheometer from TA Instruments. Frequency sweeps have been carried out in the linear domain (1% strain) at 190° C. from 100 to 0.01 rad·s$^{-1}$ under nitrogen flow to prevent thermaloxidative degradation. The used geometry was 25 mm diameter parallel plates with a 2 mm gap. The samples (25 mm diameter, 2 mm thickness) for these experiments were obtained beforehand using an injection press (Babyplast type).

The complex viscosity $\eta^*(\omega)$ is calculated according to the following equation of the linear viscoelasticity:

$$|\eta^*(\omega)| = \left[\left(\frac{G'(\omega)}{\omega}\right)^2 + \left(\frac{G''(\omega)}{\omega}\right)^2\right]^{1/2}$$

Tan delta is calculated from the loss modulus (G") being divided by the storage modulus (G') both determined at 0.1 rads and at 190° C.

EXAMPLES

The following non-limiting examples illustrate the disclosure

PE1=Polyethylene HDPE 5502 commercialised by TotalEnergies. The density according to ISO 1183-1:2012 is 0.954 g/cm$^3$; the MI$_2$ according to ISO 1133-2011 (190° C., 2.16 kg) is 0.25 g/10 min; the HLMI according to ISO 1133-2011 (190° C., 21.6 kg) is 22 g/10 min. The polyethylene was produced using a chromium-based catalyst.

The storage modulus (G') at 0.1 rads and at 190° C. was measured to be 1,855 Pa and the loss modulus (G") at 0.1 rads and at 190° C. was measured to be 2,798 Pa; resulting in a tan delta (G"/G') of 1.5.

PE1 was elected as, from a melt index point of view, it is representative of the melt index of the recycled polyethylene flux that it would be interesting to transform into injection (recycled) grades.

Example 1: Mechanical Processing

The extruder used in the experiment was Leistritz ZSE 18 HPe. The screw design was modified from the standard configuration to PTE1 and PTE2 screw designs as shown in FIG. 1. Both PTE1 and PTE2 screw designs comprise two left-handed screw sections, one in zone Z2 and one in zone Z5. Z2 is the melting zone and Z5 is a mixing zone. Both PTE1 and PTE2 screw designs one section with kneading blocks in Z4 (i.e., placed between the two left-handed screw sections).

In a first experiment, the extrusion was performed at different screw speeds for a fixed flow rate of 1.5 kg/h with the temperature profile as indicated in table 1. These temperatures correspond to the values imposed during the start-up of the test. When progressing to stable conditions, due to the transfer of mechanical heat into polymer heat in the barrel, the barrel temperatures exceed these targets. When, in a zone, the temperature exceeds the target by more than 10° C., the temperature regulation is switched off in this zone and the temperature of the zone could increase and stabilize to a higher value.

TABLE 1

| Barrels temperature profile (° C.) | | | | | | | |
|---|---|---|---|---|---|---|---|
| Z1 | Z2 | Z3 | Z4 | Z5 | Z6 | Z7 | Z8 |
| 240 | 250 | 250 | 250 | 250 | 290 | 290 | 240 |

Figure 2:
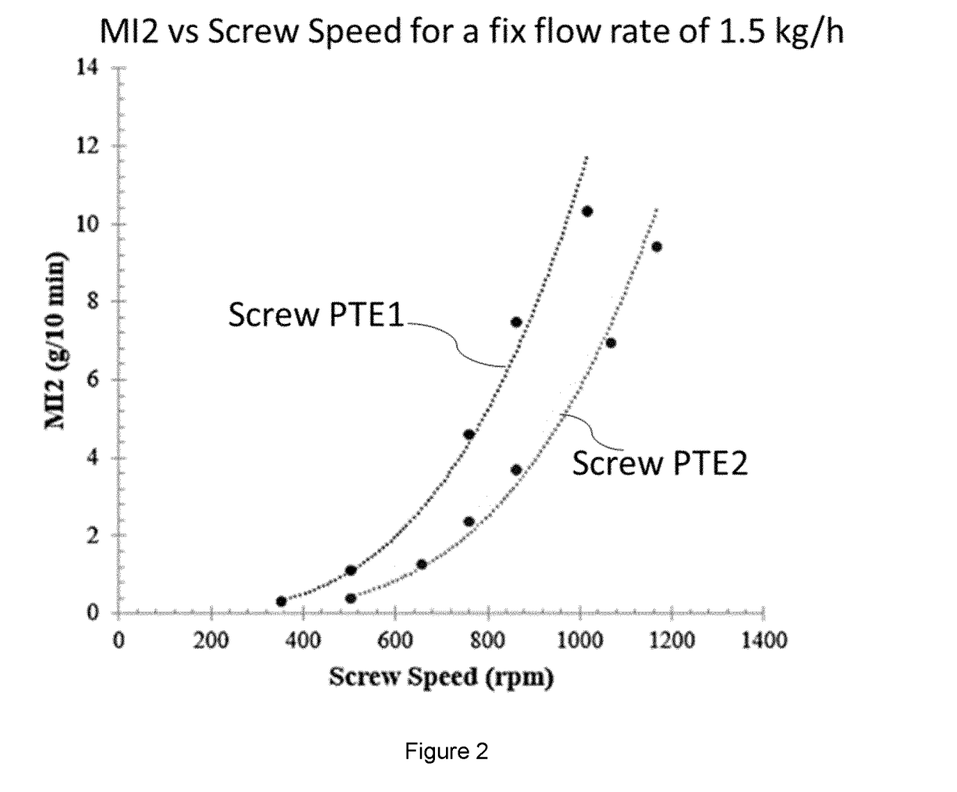
FIG. 2 is a graph plotting the $MI_2$ to the screw speed for a fixed flow rate of 1.5 kg/h.

The results on the MI2 (polymer analysis were performed when stable conditions are reached) are provided in FIG. 2, wherein it can be seen that has been possible to increase the initial MI2 of 0.2 g/10 min up to about 10 g/10 min (factor 50). The polyethylene composition obtained showed an unsaturation index of about 13,700.

In a second experiment, the extrusion was performed at different screw speeds for a fixed flow rate of 2.5 kg/h with the temperature profile as indicated in table 2. Here too, these temperatures correspond to the values imposed during the start-up of the test. When progressing to stable conditions, due to the transfer of mechanical heat into polymer heat in the barrel, the barrel temperatures exceed these targets. When, in a zone, the temperature exceeds the target by more than 10° C., the temperature regulation is switched off in this zone and the temperature of the zone could increase and stabilize to a higher value.

TABLE 2

| Barrels temperature profile (° C.) | | | | | | | |
|---|---|---|---|---|---|---|---|
| Z1 | Z2 | Z3 | Z4 | Z5 | Z6 | Z7 | Z8 |
| 270 | 340 | 340 | 340 | 340 | 340 | 340 | 240 |

Figure 3:
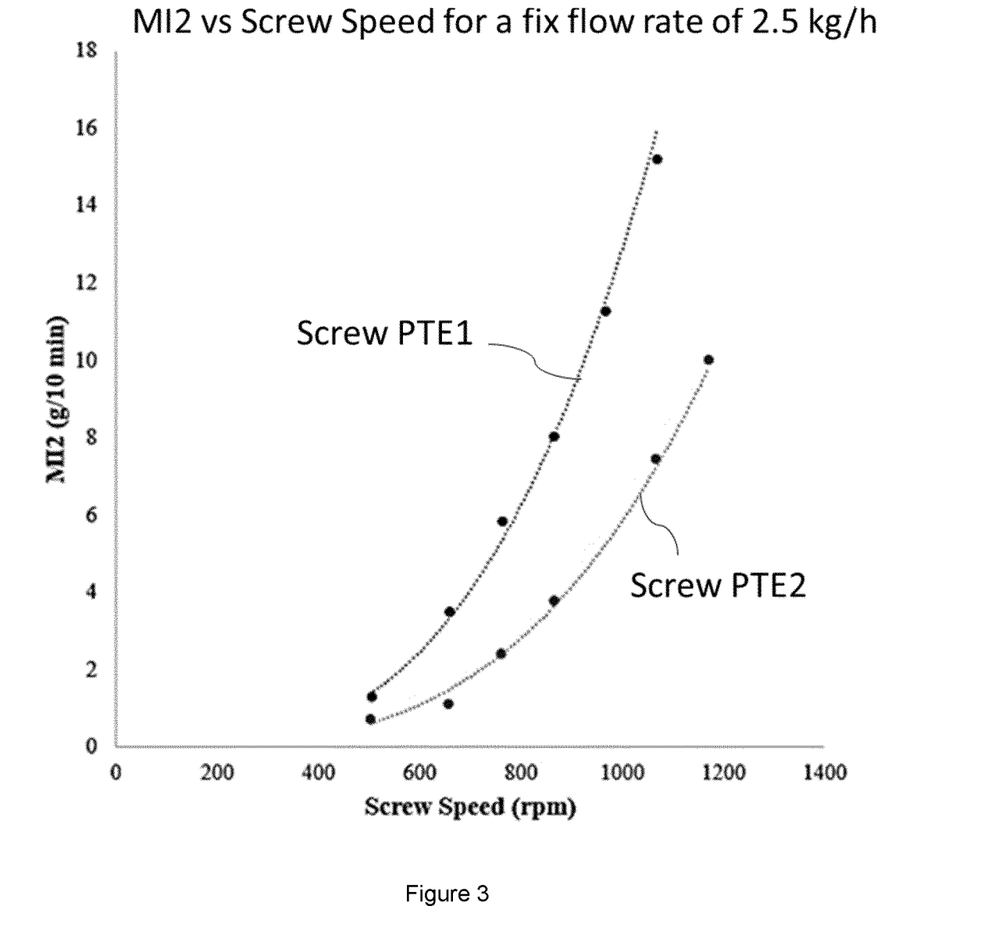
FIG. 3 is a graph plotting the $MI_2$ to the screw speed for a fixed flow rate of 2.5 kg/h.

The results on the MI2 are provided in FIG. 3 (polymer analysis were performed when stable conditions are reached), wherein it can be seen that it has been possible to increase the initial MI2 of 0.2 g/10 min up to about 16 g/10 min (factor 80). The polyethylene composition obtained showed an unsaturation index of about 13,500.

Example 2: Thermal Processing

Figure 4:
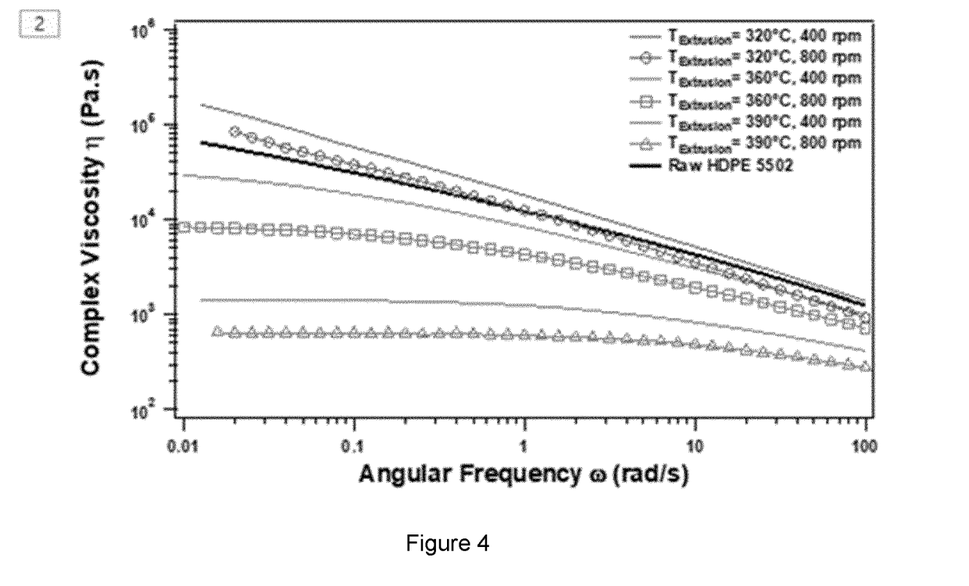
FIG. 4 is a graph plotting the complex viscosity to the angular frequency for various polyethylene-containing compositions by comparison to the initial polyethylene-containing material.

A series of experiments were then conducted wherein the thermal treatment was performed by heating the material at a temperature which was increased from 320° C. to 390° C. The experiments were performed at a screw speed of 400 and 800 rpm. The complex viscosity obtained on the treated samples is reported in FIG. 4 and compared to the initial material HDPE 5502. From the results, it can be found that a significant reduction in complex viscosity was obtained. The complex viscosity ratio of HDPE 5502 (about 13) was reduced to below 8 for all samples treated at a temperature of 340° C. or more.

Figure 5:
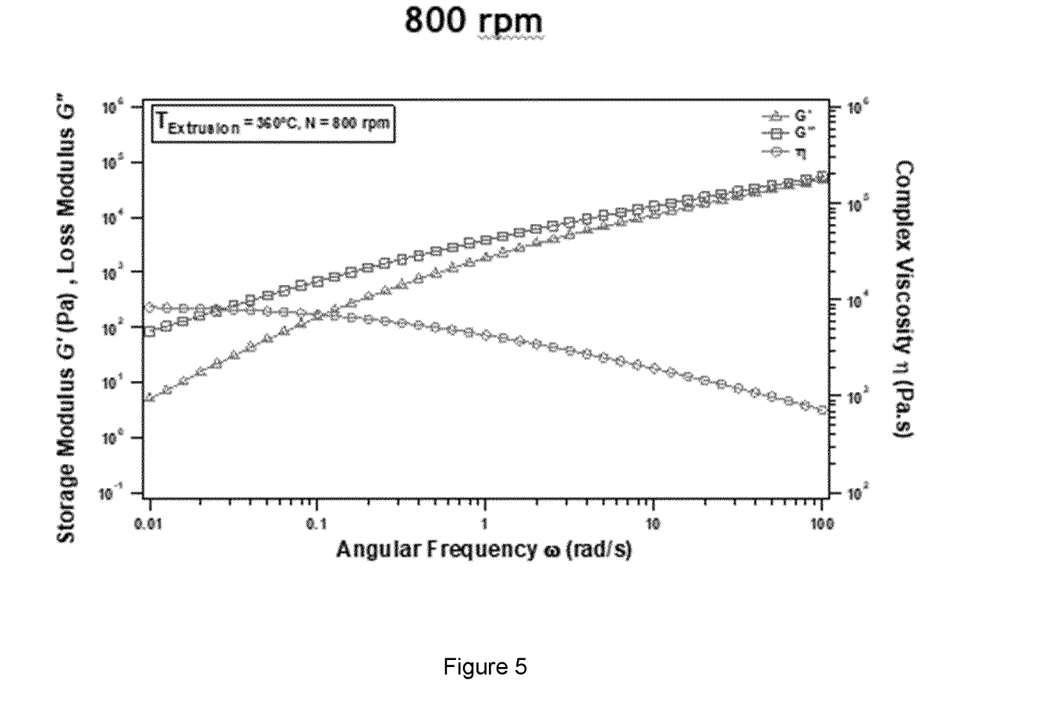
FIG. 5 is a graph plotting the complex viscosity to the angular frequency and further showing the loss (G") and storage modulus (G') for PE1 for the polyethylene composition obtained with extrusion at 800 rpm and 360° C.

FIG. 5 illustrates the increase obtained in the tan delta (G"/G') for the treated material.

The invention claimed is:

1. Polyethylene composition comprising at least 50 wt. % of polyethylene based on the total weight of the polyethylene composition, characterized in that the polyethylene composition has:
   a density of at least 0.910 g/cm³ as determined according to ISO 1183-1:2012 at 23° C.;
   a melt index $MI_2$ ranging from 3.0 to 60.0 g/10 min as determined according to ISO 1133-2011 at 190° C. under a load of 2.16 kg;
   an unsaturation index higher than 2,000 wherein the unsaturation index is the product of the Mn in Dalton and the vinyl unsaturation units per 1,000 carbon atoms as determined by ASTM D6248-98:2004;
   a complex viscosity at 0.1 rad/sec at 190° C. ranging from 200 to 20,000 Pa·s determined according to the method defined in the description; and
   a ratio of complex viscosity at a frequency of 0.01 rad/sec to the complex viscosity at a frequency of 100 rad/sec of at most 8.0, said ratio being measured at 190° C.

2. The polyethylene composition according to claim 1 is characterized in that it has a ratio of complex viscosity at a frequency of 0.01 rad/sec to the complex viscosity at a frequency of 100 rad/sec of at most 7.0, said ratio being measured at 190° C.

3. The polyethylene composition according to claim 1 is characterized in that it has a tan delta at 0.1 rad at 190° C. above 2.5 s determined according to the method defined in the description; preferably of at least 5.0.

4. The polyethylene composition according to claim 1 is characterized in that it has an Mz/Mw of at most 7.0 as determined by size exclusion chromatography; preferably of at most 6.0.

5. The polyethylene composition according to claim 1 is characterized in that it has an Mw/Mn ranging from 2.5 to 10.0 as determined by size exclusion chromatography; preferably from 2.8 to 5.0.

6. The polyethylene composition according to claim 1 is characterized in that it has a density of at least 0.930 g/cm³ as determined according to ISO 1183-1:2012 at 23° C.

7. The polyethylene composition according to claim 1 is characterized in that it has a melt index $MI_2$ ranging from 4.0 to 20.0 g/10 min as determined according to ISO 1133-2011 at 190° C. under a load of 2.16 kg.

8. The polyethylene composition according to claim 1 is characterized in that it has an unsaturation index higher than 5,000 wherein the unsaturation index is the product of the Mn in Dalton and the vinyl unsaturation units per 1,000 carbon atoms as determined by ASTM D6248-98:2004.

9. The polyethylene composition according to claim 1 is characterized in that it has a complex viscosity at 0.1 rad/sec at 190° C. ranging from 400 to 12,000 Pa·s; preferably from 400 to 8,000 Pa·s.

10. The polyethylene composition according to claim 1 is characterized in that it is produced by a process comprising the following steps:
    a) providing a twin-screw extruder with thermal regulation devices;
    b) providing an initial polyethylene-containing material comprising at least 50 wt. % of polyethylene based on the total weight of the initial polyethylene-containing material;
    c) extruding the initial polyethylene-containing material to obtain a polyethylene composition; wherein extrusion is performed with a residence time of less than 20 min; and
    d) recovering a polyethylene composition;
    wherein step (c) of extruding comprises a thermal treatment of the initial polyethylene-containing material at a temperature of at least 340° C. in one or more hot zones of the extruder by self-heating of the material wherein the one or more hot zones have a total length equal to or greater than 6 D with D being the screw diameter, wherein the extrusion is performed with mechanical specific energy greater than or equal to 0.4 kWh/kg, wherein the screw profile comprises at least one hot zone with successive kneading blocks elements over a length of at least 4 D followed by a left-handed element with D being the screw diameter, wherein the thermal regulation devices, are set to initial imposed barrel temperatures ranging between 24° and 320° C., and are switched off when the barrel temperature in the zone spontaneously exceeds the imposed barrel temperature by at least 3° C. without the need of external heat application.

11. The polyethylene composition according to claim 1 is characterized in that it is produced by a process comprising the following steps:
    a) providing a twin-screw extruder with thermal regulation devices;
    b) providing an initial polyethylene-containing material comprising at least 50 wt. % of polyethylene based on the total weight of the initial polyethylene-containing material;
    c) extruding the initial polyethylene-containing material to obtain a polyethylene composition; wherein extrusion is performed with a residence time of less than 20 min; and
    d) recovering a polyethylene composition;
    wherein step (c) of extruding comprises a thermal treatment of the initial polyethylene-containing material at a temperature of at least 340° C. in one or more hot zones of the extruder by heating the material using the thermal regulation devices of the extruder to have a maximum barrel temperature ranging from 340 to 460° C. in at least one hot zone of the extruder.

12. The polyethylene composition according to claim 10 is characterized in that the screw profile comprises two or more hot zones wherein a first hot zone comprises successive kneading blocks elements over a length of at least 4 D followed by a left-handed element with D being the screw diameter, and one or more additional hot zones placed downstream the first hot zone are filled mixing zones, each comprising kneading blocks elements over a length of at least 4 D followed by a kneading left-handed element or by a left-handed element with D being the screw diameter.

13. The polyethylene composition according to claim 10 is characterized in that the successive kneading blocks elements of at least one hot zone of the extruder comprise disks with disks offset by 90 degrees and a disk width of at least 0.3 D wherein D being the screw diameter and/or in that one hot zone of the extruder is or comprises the melting zone of the extruder.

14. The polyethylene composition according to claim 10 is characterized in that the initial polyethylene-containing material is selected to have:
- a high load melt index (HLMI R) of at least 1.0 g/10 min as determined according to ISO 1133-2011 at 190° C. under a load of 21.6 kg; and/or
- a melt index ($MI_2$ R) of at most 3.0 g/10 min as determined according to ISO 1133-2011 at 190° C. under a load of 2.16 kg; and/or
- a density of at least 0.910 g/cm$^3$ as determined according to ISO 1183-1:2012 at 23° C.

15. The polyethylene composition according to claim 10 is characterized in that the initial polyethylene-containing material is selected to have a high load melt index (HLMI R) of at least 1.0 g/10 min as determined according to ISO 1133-2011 at 190° C. under a load of 21.6 kg, a melt index ($MI_2$ R) of at most 0.45 g/10 min as determined according to ISO 1133-2011 at 190° C. under a load of 2.16 kg and a density of at least 0.940 g/cm$^3$ as determined according to ISO 1183-1:2012 at 23° C.

16. The polyethylene composition according to claim 10 is characterized in that the initial polyethylene-containing material is selected to have a melt index ($MI_2$ R) ranging from 0.8 to 1.5 g/10 min as determined according to ISO 1133-2011 at 190° C. under a load of 2.16 kg and a density ranging from 0.910 g/cm$^3$ to 0.930 g/cm$^3$ as determined according to ISO 1183-1:2012 at 23° C.

17. The polyethylene composition according to claim 10 is characterized in that the ratio of the melt index of the polyethylene composition ($MI_2$ T) to the melt index of the initial polyethylene-containing material ($MI_2$ R) is at least 10.

18. The polyethylene composition according to claim 10 is characterized that in step (c) of extruding the initial polyethylene-containing material comprises performing the extrusion with a residence time is ranging from 10 to 180 seconds; and/or step (c) of extruding the initial polyethylene-containing material comprises a thermal treatment at a temperature ranging from 320 to 460° C.

19. Article produced from the polyethylene composition according to claim 1 characterized in that the article is an injection-molded article; preferably, the article is selected from a bottle or a container.

20. A method to produce an injection molded article characterized in that it comprises a step of providing an polyethylene composition according to claim 1 and producing an injection molded article from said polyethylene composition; with preference, the initial polyethylene-containing material is a recycled polyethylene-containing material.

* * * * *

UNITED STATES PATENT AND TRADEMARK OFFICE
CERTIFICATE OF CORRECTION

PATENT NO. : 12,234,328 B1
APPLICATION NO. : 18/837103
DATED : February 25, 2025
INVENTOR(S) : Lhost et al.

Page 1 of 1

It is certified that error appears in the above-identified patent and that said Letters Patent is hereby corrected as shown below:

In the Claims

Claim 10, Column 24, Line 23:
"barrel temperatures ranging between 24° and 320° C.,"

Should read:
"barrel temperatures ranging between 240 and 320° C.,"

Signed and Sealed this
Sixth Day of May, 2025

Coke Morgan Stewart
*Acting Director of the United States Patent and Trademark Office*